Patented Sept. 18, 1945

2,384,882

UNITED STATES PATENT OFFICE 2,384,882

VINYLIDENE CHLORIDE COMPOSITIONS

Edgar C. Britton and Harold W. Moll, Midland, Mich., assignors to The Dow Chemical Company, Midland, Mich., a corporation of Michigan No Drawing. Application July 18, 1941, Serial No. 403,014

2 Claims. (Cl. 260—27)

This invention relates to thermoplastic compositions comprising polymeric vinylidene chloride products modified with thermally processed natural resins.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono and dicarboxylic acids. The polymer of vinylidene chloride alone is described in U. S. Patent No. 2,160,903 and many of its co-polymers with other polymerizable compounds, as well as certain plasticized compositions comprising these co-polymers, and ways in which the products may be made, are described in U. S. Patents 2,160,904; 2,206,022; 2,215,379 and 2,160,931 to 2,160,948, inclusive.

The thermally processed natural resins here employed are those natural resins which have been subjected either to a heat treatment alone, or to hydrogenation or other clarifying or modifying treatment at an elevated temperature, and include both the run resins and, for example, hydrogenated rosin.

According to the present invention, thermally processed natural resins are incorporated with a polymeric vinylidene chloride product to produce a mass which can be molded or extruded to form articles having a waxy "handle" and high gloss. For example, a processed natural resin may be incorporated with a polymeric vinylidene chloride product having a softening point only slightly below its decomposition point to produce a mass that can be extruded at relatively low temperatures and pressures to form valuable articles, threads, bands, filaments, foils, and the like, which retain the high tensile strength and toughness shown by the parent polymeric vinylidene chloride product. Furthermore, addition of processed natural resins to a polymeric vinylidene chloride product, in many cases, has a plasticizing effect, particularly at elevated temperatures, and produces a mass that has thermoplastic properties superior to the polymeric vinylidene chloride product alone, and may be molded or shaped to form useful articles having a tough, durable finish with a high gloss, and which retain a resistance to chemicals typical of polymeric vinylidene chloride products. The processed natural resins, though apparently compatible at fusion temperatures, become incompatible at room temperature with polymeric vinylidene chloride products. Such resins yield masses that can be molded or extruded to form articles that vary from translucent to opaque when cold and which have a tough, glossy finish.

The addition of the thermally processed natural resins to the polymeric vinylidene chloride product may be effected by any of several methods. For example, the polymeric vinylidene chloride product and the particular processed natural resin to be employed may be mixed or ground together in a ball mill or other suitable mixer commonly employed in the plastic art, or they may be added to the polymer on hot rolls in a method similar to compounding rubber compositions. Another satisfactory method of incorporating the processed natural resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof:

Example 1

2.5 grams of S & W Congo Ester, a heat processed natural resin having a melting point of 86°–94° C., and 5.0 grams of 1,2-epoxy-3-(2-phenylphenoxy) propane, to serve as a heat stabilizer, were incorporated with 20 milliliters of acetone. To the resulting product was added 42.5 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.011 inch, prepared from this material were flexible, glossy threads with a waxy handle and had a tensile strength above 36,000 pounds per square inch.

Example 2

2.5 grams of Stabellite A-1, a hydrogenated rosin having a melting point of 53°–56° C., and 5.0 grams of tributyl aconitate, to serve as a heat stabilizer, were incorporated with 20 milliliters of acetone. To the resulting product was added 42.5 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.0125 inch, prepared from this material were tough, flexible threads and had a tensile strength above 39,000 pounds per square inch.

*Example 3*

A composition was prepared as in Example 1 but substituting East India Batu, nubs and chips, run, a thermally processed natural resin having a melting point of 112°–125° C., for the S & W Congo Ester. The composition could easily be molded or extruded and filaments, having a diameter of 0.016 inch, prepared from this material were tough, glossy threads and had a tensile strength above 44,000 pounds per square inch.

*Example 4*

A composition was prepared as in Example 1 but substituting Congo Copal NO-11, run, a thermally processed natural resin having a melting point of 105°–115° C., for the S & W Congo Ester. The composition could easily be molded or extruded and filaments, having a diameter of 0.017 inch, prepared from this material were flexible, shiny threads and had a tensile strength above 36,000 pounds per square inch.

*Example 5*

A composition was prepared as in Example 1 but substituting Kauri Copal, pale No. 3, run, a thermally processed natural resin having a melting point of 114°–117° C., for the S & W Congo Ester. The composition could easily be molded or extruded and filaments, having a diameter of 0.019 inch, prepared from this material were opaque, tough, waxy threads and had a tensile strength above 40,000 pounds per square inch.

*Example 6*

A composition was prepared as in Example 1 but substituting Batavia Damar A/D, run, a thermally processed natural resin having a melting point of 85°–93° C., for the S & W Congo Ester. The composition could easily be molded or extruded and filaments, having a diameter of 0.017 inch, prepared from this material were translucent, flexible threads with a waxy handle and had a tensile strength above 43,000 pounds per square inch.

*Example 7*

A composition was prepared as in Example 1 but substituting Kopol 501, a processed natural resin having a melting point of 88°–97° C., for the S & W Congo Ester. The composition could easily be molded or extruded and filaments having a diameter of 0.015 inch, prepared from this material were flexible, translucent, waxy threads and had a tensile strength above 44,000 pounds per square inch.

*Example 8*

3.0 grams of Stabellite A-1, a hydrogenated rosin having a melting point of 53°–56° C., and 2.0 grams of a co-polymer consisting of 90 per cent vinylidene chloride and 10 per cent vinyl chloride, were placed in a test tube and heated to a fusion temperature. On cooling the product was obtained as a brittle, amber colored, homogeneous mass.

*Example 9*

4.5 grams of S & W Congo Ester, a heat processed natural resin having a melting point of 86°–94° C., and 0.5 gram of a co-polymer as in Example 8, were heated to a fusion temperature. The product was an amber colored, brittle, homogeneous mass.

The compositions containing relatively low proportions of the thermally processed natural resins have improved molding and extruding properties while the compositions containing relatively large proportions of the resins are hard brittle masses. The latter compositions may be advantageously used in preparing improved lacquers, varnishes or paints.

The proportion of thermally processed natural resin to be employed in the new compositions depends upon the hardness, toughness, strength and flexibility desired in the modified composition. For example, compositions for use in injection molding must flow well at molding temperatures but should harden rapidly at lower temperatures. They should be hard enough when cold to withstand scratching and tough enough to withstand shock. Compositions for use in making thin films, foils, or filaments should have high flexibility at all temperatures met with in service and be sufficiently hard and tough enough to withstand abrasion. Similarly, lacquer coatings must be hard, tough and possess good adherence and flexibility. The exact proportion of modifying agent to be employed in preparing the new compositions will depend on the use requirements. In general from about 0.5 to about 90 per cent of the thermally processed natural resin may be employed, based on the weight of the polymeric vinylidene chloride product with which they are incorporated. When it is desired simply to produce a product having improved molding and extruding properties and which can be worked to form useful articles, threads, bands, filaments, foils and the like which retain the high tensile strength shown by the parent polymeric vinylidene chloride product the amount of the thermally processed natural resin will ordinarily vary from about 0.5 to about 40 per cent and more specifically from about 2 to about 7.5 per cent. When, however, it is desired to produce a polymeric vinylidene chloride product which is substantially more compatible with many of the commonly used lacquer solvents the amount of thermally processed natural resin employed may vary from about 10 to about 90 per cent.

While the above examples show the preparation of compositions from a polymeric vinylidene chloride product consisting of a co-opolymer of 90 per cent vinylidene chloride and 10 per cent vinyl chloride, incorporated with processed natural resins, other polymeric vinylidene chloride products which have wide commercial value and which may be advantageously used in preparing the new compositions includes the co-polymers containing from about 5 to 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained for a considerable period of time, it is desirable to have present in the composition a heat-stabilizing agent which acts to decrease or prevent thermal decomposition. Compounds applicable for this purpose include 1,2-epoxy-3-(2-phenylphenoxy) propane, allyl-disulfide, 2-chloroallyl-disulfide, 2,2'-dihydroxybenzophenone, tributyl aconitate, dipropyl maleate, 2-phenoxyethyl cinnamate, di-(alpha-phenylethyl) ether.

The incorporation of minor amounts of coloring agents, fillers, plasticizers, and the like has also been found to be useful and desirable when used in such amount that the desirable mechanical properties of the product are not affected.

As will be seen from the above description, the properties of polymeric vinylidene chloride products can be varied widely, according to the amount and type of processed natural resin incorporated therein, to produce products that are useful in the preparation of articles of all kinds. The herein-described compositions have, among others, the following advantages: (1) they have low molding and softening temperatures well below their thermal decomposition temperatures, (2) they may be molded or extruded at relatively low pressure to form valuable articles, filaments, threads, bands, or foils, (3) they are substantially more compatible with many lacquer solvents than the polymeric vinylidene chloride product alone, and (4) they are heat-stable masses which may be worked to produce articles having a tough, durable, and glossy finish.

Other modes of applying the principle of our invention may be employed instead of those explained, change being made as regards the materials employed, provided the product recited in the following claims be obtained.

We therefore point out and distinctly claim as our invention:

1. A thermoplastic composition, the essential ingredients of which are a polymer of vinylidene chloride, wherein the vinylidene chloride constitutes at least 70 per cent of the polymer, and from about 0.5 to about 40 per cent, based on the weight of the polymer, of a resin selected from the class consisting of the run natural resins and hydrogenated rosin.

2. A thermoplastic composition, the essential ingredients of which are a polymer of vinylidene chloride, wherein the vinylidene chloride constitutes at least 70 per cent of the polymer, and from 2 to 7.5 per cent of hydrogenated rosin, based on the weight of the polymer.

EDGAR C. BRITTON.
HAROLD W. MOLL.